Figure 1:
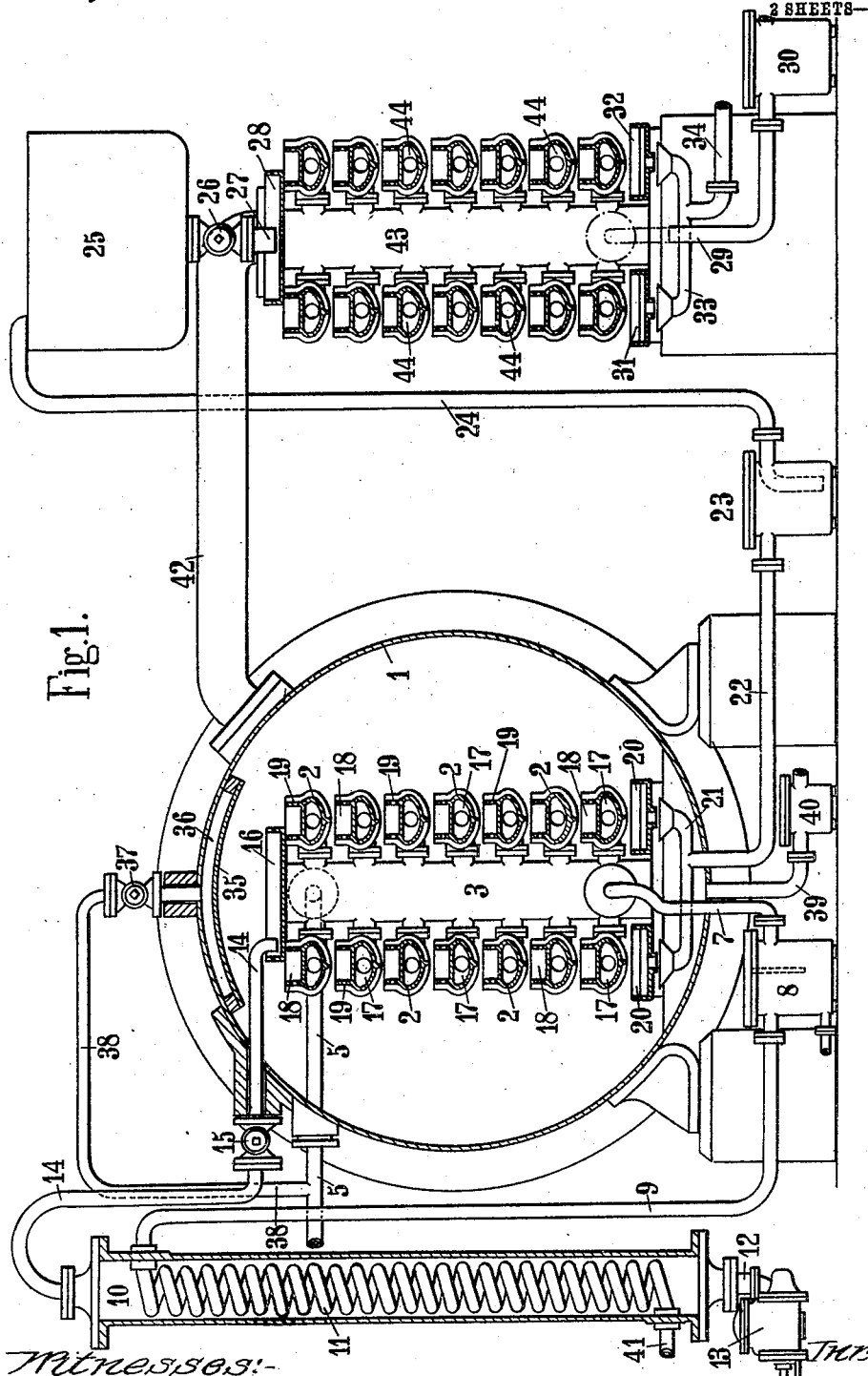

O. VENTER.
APPARATUS FOR CONCENTRATING LIQUIDS.
APPLICATION FILED SEPT. 5, 1908.

937,976.

Patented Oct. 26, 1909.
2 SHEETS—SHEET 2.

Witnesses:-
C. H. Crawford
E. Schallinger

Inventor:-
Otto Venter
by B. Singer
Attorney

UNITED STATES PATENT OFFICE.

OTTO VENTER, OF CHEMNITZ, GERMANY.

APPARATUS FOR CONCENTRATING LIQUIDS.

937,976.

Specification of Letters Patent.   Patented Oct. 26, 1909.

Application filed September 5, 1908.   Serial No. 451,861.

*To all whom it may concern:*

Be it known that I, OTTO VENTER, a subject of the German Emperor, and residing at Chemnitz, Germany, have invented a certain new and useful Improved Apparatus for Concentrating Liquids, of which the following is a specification.

The present invention relates to devices for concentrating liquids, particularly lyes, two or more evaporators being connected in series by which the liquid or lye is evaporated under a pressure decreasing by stages, the pressure being approximately constant in each evaporator but decreasing by stages in each succeeding evaporator with respect to the preceding one.

In accordance with the invention the liquid to be evaporated alternately flows in a thin layer over heated surfaces and is alternately heated in chambers, the evaporation being effected by the first evaporator, and, if desired, by the following evaporators, working at a pressure exceeding atmospheric pressure.

An important object of the present invention therefore is to provide apparatus in which the liquid to be evaporated alternately flows in a thin layer over heated surfaces and is alternately heated in chambers. The advantage is then obtained that the liquid to be evaporated after having lost a part of its heat on passing the heated surfaces is heated again to the boiling-point in the chamber arranged between the heated surfaces. On account of the liquid to be evaporated being heated again in the chambers to the original temperature, it is evaporated more actively while passing the trickle heater. The more active evaporation of the liquid passing the trickle heater causes the liquid which is to be evaporated to become saturated, when flowing in a thin layer over the next upper trickle heater, with a part of the water vapors forming under pressure in the first vessel. When the liquid after having passed the heater of the first evaporator is forced into the second evaporator and passes the trickle heater of the same in a thin layer, a part of the water vapors with which the liquid has been saturated leaves the liquid, since the pressure in the second evaporator decreases with respect to the preceding one. The escape of a part of the water vapors contained in the liquid causes the evaporation in the second evaporator to take place readily and actively. The active evaporation of the liquid passing the trickle heaters is obtained by the liquid which begins to pass each trickle heater being heated in a chamber. The same effect is produced in a third evaporator, in the event of such a one being employed, because in a third evaporator the pressure decreases with respect to the preceding one.

Figure 2:
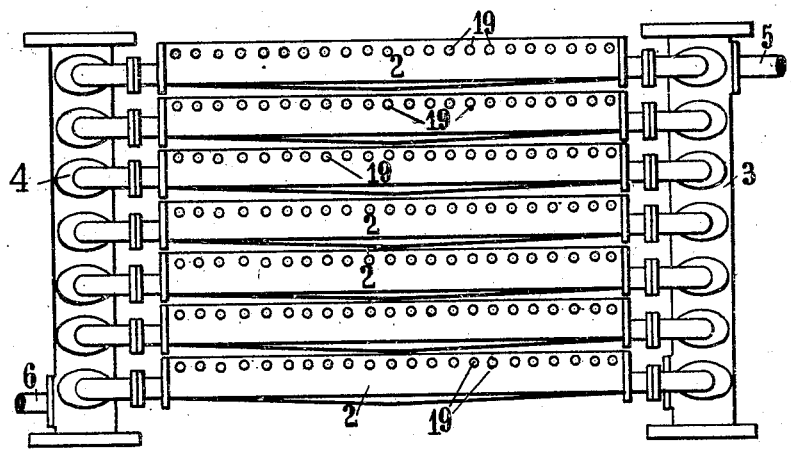
Figure 3:
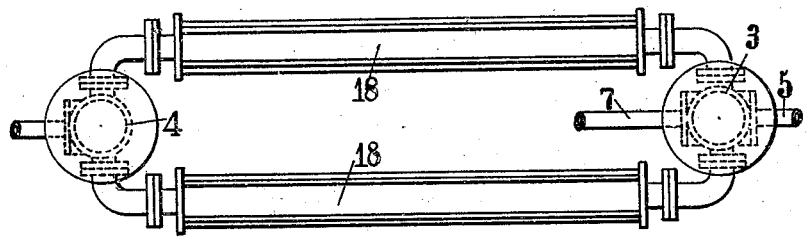

In order that the invention may be clearly understood reference will be made to the accompanying drawings in which one embodiment is represented by way of example, and in which:

Figure 1 is a vertical section through the new evaporating plant, whereas Fig. 2 is a side elevation of the heater, and Fig. 3 a plan of the latter.

Referring to the drawings, 1 is a cylindrical vessel capable of being closed and having a horizontal axis, in which vessel a heater is arranged. The heater is formed as a trickle-evaporator and consists of several, for example, two sets of seven hollow heating elements 2 which are connected to the distribution pipe 3 and to the collecting pipe 4, as clearly shown in Figs. 2 and 3. The distribution pipe 3 is connected with the steam admission pipe 5, and the collecting pipe 4 with the condensed water discharge pipe 6. Into the distributing pipe 3 there also opens the steam emission pipe 7 which opens at its other end into the condensed water separator 8. With the latter is connected the steam pipe 9 which is connected with a feed heater or preheater comprising the coil 11 in the shell 10. The coil 11 ends in the socket 41. To the shell 10 is connected the delivery pipe 12 of the pump 13 by means of which the liquid is pumped into the shell. To the top of the shell 10 there is connected the pipe 14 adapted to be closed by the faucet 15, which pipe extends into the vessel 1 and opens into the distributing vessel 16 which is open above. The various heating elements 2 each consist of the curved walls inclosing the passageway or steam space 17 and the distributing and heating chamber 18 situated above the space 17, the longitudinal walls of which distributing space are provided with the distributing openings 19. Under the heater are provided collecting vessels 20, 20 which are destined to receive the concentrated liquid leaving the heaters and to transfer the same to the pipes 21, 22. The pipe 22 opens into the pressure vessel 23, the delivery pipe 24 of which opens into the storage reservoir 25. The latter is connected through the socket 27, adapted to be closed by means of the faucet 26, with the distributing vessel 28 of a second heater which possesses the same arrangement as the above described heater.

Below the second heater there are arranged the collecting vessels 31, 32 which are connected by the pipe 33 with the discharge pipe 34. The condensed water discharge pipe 29 of this second heater opens into the condensing vessel 30. Above the heater inclosed in the vessel 1 the top of the vessel 1 is chambered by means of a wall 35. The chamber 36 between the wall 35 and the wall of the vessel 1 is connected by the pipe 38, adapted to be closed by the faucet 37, with the steam pipe 5. The vessel 1 is provided below with a discharge-pipe 39 opening into the condensing vessel 40 and is connected above the pipe 42 with the distributing pipe 43 of the second heater.

The manner in which this device operates is as follows:

*Course of the heating steam.*—The heating steam passes through pipe 5 into the distributing pipe 3, flows to and fro in a zig-zag course through the spaces 17 of the elements 2 and on through the pipe 7, giving up its heat to the walls inclosing these passage-ways 17 and thereby evaporating the liquid. The condensed water which forms is led away through pipe 6. Simultaneously a part of the heating steam passes through pipe 7 into the condensed water separator 8 and through pipe 9 into the coil 11 of the preheater where it gives up the heat contained in it to the liquid surrounding the heating coil. The condensed water precipitated in the coil is led away through the socket 41. Another part of the heating steam passes from the pipe 5 out through the pipe 38 into the chamber 36 and here heats the wall 35.

*Course of the liquid.*—This is forced by the pump 13 through the delivery pipe 12 into the preheater 10, is here heated by the heating coil 11 and then passes through pipe 14 into the distributing vessel 16. The liquid flows out of the latter into the two distributing chambers 18 of the uppermost heating elements, and fills up the same. In the chambers 18 the liquid is heated to boiling-point by the steam passing through the spaces 17. Then the liquid flows through the openings 19 in a thin layer over the exterior surfaces of the walls inclosing the spaces 17, descends from said surfaces in fine jets or drops into the distributing chambers 18 of the two next heating elements. When the liquid flows in a thin layer over the heated surfaces and is evaporated upon these surfaces, it loses a part of its heat, but is heated again to boiling point in the chambers 18 of the two next heating elements. Then the liquid trickles through the openings 19 in the chambers 18 again in a thin layer over the external surfaces of the walls inclosing the steam spaces 17 and then passes into the distributing chambers 18 of the two third-highest heating elements, in which the liquid is heated again. In the same manner the liquid passes the next following heating elements and passes finally into the collecting vessel 20. From the latter it is led through the pipes 21, 22 into the pressure-vessel 23 which is provided with one of those well known contrivances for automatically regulating the entrance of the liquid into the pressure vessel and the exit of the same into the discharge-pipe. From the pressure vessel the liquid is forced through the pipe 24 into the storage reservoir 25 from which it passes into the distributing vessel 28 of the second evaporating vessel. From the latter it passes the second heater in the same manner as previously the first. The concentrated liquid collects in the vessel 31, 32 and is delivered by the latter to the pipes 33, 34 which lead it to the place where it is further treated.

In the vessel 1 the liquid which passes over the heaters is evaporated under pressure. If, for example, the heating steam of the heating body possesses an excess pressure of three atmospheres, after permanency has been reached an excess pressure of about 1.5 atmospheres will obtain in consequence of the lively evaporation taking place in the closed vessel 1, so that the boiling temperature of the liquid should lie at about 128° C. The water vapors forming under pressure in the vessel 1 pass through pipe 42 into the distributing pipe 43 of the second heater, and will here flow through the heating elements 44 and correspondingly further concentrate the liquid trickling over the same. The condensed water forming in the second heater is led through pipe 29 into the condensing vessel 30.

Since the wall 35 is heated, the water vapor escaping from the evaporated liquid and rising upward cannot condense on said wall 35 and fall back into the distributing vessel 16. The condensed water deposited on the lateral portions of the vessel 1 is led through pipe 39 into the condensing vessel 40.

It is obvious that instead of connecting in series two evaporators, several evaporators, for example four, may be connected. In this case the excess pressure under which the evaporation takes place would likewise fall by stages down to one atmosphere, whereby the same high efficiency as in the former four-body apparatus working under vacuum would be obtained.

Further, the above described process can be employed in combination with the well known method in which evaporation takes place under a vacuum, and in this manner a combined evaporation process can be employed in which the evaporation is conducted partially under pressure in excess of atmospheric pressure and partially under a partial vacuum.

What I claim as my invention and desire to secure by Letters Patent is:

1. In apparatus for concentrating liquids, the combination, with an evaporator comprising a closed vessel containing a trickle heater, a pipe for supplying liquid to said heater, a pipe for supplying steam to said heater, and a pipe for conducting steam from said heater, of a feed heater comprising a shell and a coil, said coil being connected with said last named pipe and said shell with said first named pipe, and a pump for forcing liquid to be concentrated through said shell to said heater.

2. In apparatus for concentrating liquids, the combination, with an evaporator comprising a closed vessel containing a trickle heater, a pipe for supplying liquid to said heater, a pipe for supplying steam to said heater, and a pipe for conducting steam from said heater, of a feed heater comprising a shell and a coil, said coil being connected with said last named pipe and said shell with said first named pipe, and a pump for forcing liquid to be concentrated through said shell to said heater, the inside of said vessel being chambered above said heater, and a pipe connected with said steam supply pipe and opening in the chamber above said heater.

In testimony whereof, I affix my signature in the presence of two witnesses.

OTTO VENTER.

Witnesses:
WILLIAM J. KOUJETSEN,
FREDERICK J. DIETZMAN.